United States Patent [19]

Connolly et al.

[11] 3,956,596

[45] May 11, 1976

[54] CIRCUIT ARRANGEMENTS IN TELEPHONE APPARATUS

[75] Inventors: David Charles Antony Connolly, Shildon; Per Jorgen Hovland; Robert Andrew Stevenson, both of Newton Aycliffe, all of England

[73] Assignee: The General Electric Company Limited, London, England

[22] Filed: Apr. 10, 1974

[21] Appl. No.: 459,860

[30] Foreign Application Priority Data

Apr. 10, 1973 United Kingdom............... 17183/73
June 22, 1973 United Kingdom............... 29781/73

[52] U.S. Cl. ............................................ 179/90 K
[51] Int. Cl.².......................................... H04M 1/44
[58] Field of Search .............. 179/90 R, 90 K, 90 B, 179/90 BB; 320/56

[56] References Cited
UNITED STATES PATENTS

| | | | |
|---|---|---|---|
| 3,601,552 | 8/1971 | Barnaby et al..................... | 179/90 B |
| 3,787,639 | 1/1974 | Battrick ............................ | 179/90 K |
| 3,856,982 | 12/1974 | Lawson............................... | 179/90 K |

*Primary Examiner*—Kathleen H. Claffy
*Assistant Examiner*—Gerald L. Brigance
*Attorney, Agent, or Firm*—Kirschstein, Kirschstein, Ottinger & Frank

[57] ABSTRACT

A pushbutton telephone semiconductor dialling circuit power supply comprising a capacitor fed by a diode bridge placed in series with the line looping circuit during dialling. The capacitor size is chosen to charge to at least minimum circuit supply voltage during make periods of line looping, and to keep the circuit supplied during break periods. A constant current charging circuit may be employed to charge the capacitor from the bridge to improve performance, with a diode to power the circuit directly from the bridge while the capacitor is still charging.

The microphone-bridging off-normal contacts may be replaced by a transistor switching circuit.

2 Claims, 6 Drawing Figures

CIRCUIT ARRANGEMENTS IN TELEPHONE APPARATUS

This invention relates to circuit arrangements in telephone apparatus.

According to one aspect of the present invention, in telephone apparatus, such as a subscriber's set, including an electronic circuit arrangement for generating dialling impulses an arrangement for energising said electronic circuit arrangement comprises a capacitor, rectifier means, switching means selectively to connect said capacitor and rectifier means in a path between line terminals of the apparatus such that said capacitor is then charged by way of said rectifier means by current flowing from a remote source by way of said line terminals, and means to energise said electronic circuit arrangement from the charge on said capacitor.

According to another aspect of the invention, in telephone apparatus, such as a subscriber's set, including an electronic circuit for generating dialling impulses, a circuit arrangement for energising said electronic circuit comprises a capacitor, rectifier means connecting said capacitor in series with the line loop such that in use the capacitor is charged by current flowing through the rectifier means, normally closed switch means connected in shunt with said rectifier means, which switch means is arranged to be opened during a dialling operation, the capacitor being of such a value as to be charged in a period when the line is looped during dialling at least to a minimum operating voltage for the electronic circuit, and to hold sufficient charge to supply current to operate the electronic circuit during the periods when the line loop is broken during dialling.

Preferably the rectifier means is a full-wave bridge rectifier. The capacitor may be shunted by a voltage limiter such as a zener diode.

The normally closed switch means may form part of a switch having the same function as a "dial-off-normal" switch provides in telephone apparatus having a dial.

Where the electronic circuit is a pushbutton operated dial impulse generator employing a semiconductor store, for example as described in our United Kingdom Pat. No. 1,236,961, or in co-pending United Kingdom patent application Nos. 56228/71 and 19365/72, in which a dialling operation is initiated by depression of one of a plurality of pushbuttons but the "dialling" operation is not necessarily completed by the time the pushbutton is released, the said normally-closed switch means preferably comprises two series-connected switches, one of said switches being opened by depression of any of the pushbuttons and the other of said switches being opened during generation and transmission of the dialling impulses.

The switch means may comprise one or more reed relays.

The capacitor may be connected in series with a charging current regulating circuit, unidirectional current carrying means being coupled between the regulating circuit and the electronic circuit such that the electronic circuit receives a current supply immediately the normally closed contact means is opened. The charging current regulating circuit may comprise a resistor, or a transistor circuit arranged to act as a constant current element. The unidirectional current carrying means may comprise a pair of diodes poled respectively to conduct current to the electronic circuit from the line loop immediately the normally closed contact means is opened and from the capacitor when the line loop is broken.

According to a further aspect of the invention, in telephone apparatus, for example a telephone set, having provision for pushbutton calling and an electronic circuit for causing trains of impulses to be generated, said trains of impulses characterising the pushbuttons that have been pressed, by interrupting the line loop through the apparatus, there is provided a circuit arrangement for powering said electronic circuit with energy received, during use, over the line wires to which the apparatus is connected, said circuit arrangement comprising a storage capacitor, a current supply circuit and switch means, the arrangement being such that when, during use, a pushbutton is depressed the switch means is operated to remove a short circuit from across the input side of the current supply circuit and thereby permit line current to pass through the current supply circuit to energise said electronic circuit and to charge said capacitor which is of such capacity that the charge stored thereby is sufficient to power the electronic circuit while the loop is interrupted when impulses are being transmitted.

Preferably said current supply circuit comprises rectifier means. If this rectifier means is a full wave rectifier, it enables unidirectional current to be supplied to the electronic circuit regardless of the line polarity.

According to a further aspect of the invention, in telephone apparatus, such as a subscriber's set, including an electronic circuit for generating dialling impulses, a circuit arrangement for energising said electronic circuit comprises a capacitor, rectifier means, and switch means for connecting said rectifier means in series with the line loop and for connecting said capacitor to be charged by at least a portion of line loop current passing through said rectifier means, during the time that said electronic circuit requires current for its operation, and for preventing line loop current passing through said rectifier means when dialling has ceased, the rectifier means being in shunt relationship with the speech circuits of the apparatus, which speech circuits are disconnected by a normally closed series switch when said electronic circuit requires current for its operation, and the line loop current path through the rectifier means being opened when dialling has ceased.

Preferably said line loop current path through the rectifier means is opened by a transistor switch which is closed when said electronic circuit requires current for its operation. The rectifier means is preferably shunted by or constituted by at least one zener diode to maintain continuity of a path for line loop current during changeover of the switch means from predialling to dialling conditions if the switch means open circuits both the rectifier and transducer circuits during the changeover.

The switch means for preventing line loop current passing through the rectifier means when dialling has ceased preferably comprises a transistor connected between said rectifier means and said capacitor to control rectified line loop current passing to said capacitor, the transistor being switched to conduction at the commencement of and for the duration of dialling, the transistor reverting to non-conduction at the cessation of dialling whereby to open-circuit said rectifier means to line loop current.

Embodiments of the invention will now be described by way of example with reference to the accompanying drawings, of which:

Figure 1:
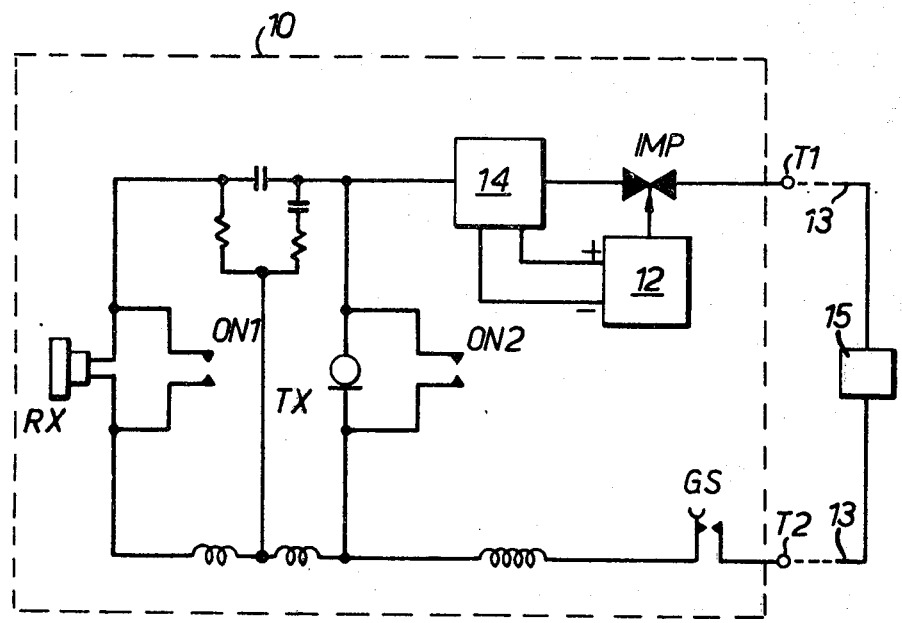
FIG. 1 is a schematic circuit diagram showing the location of the circuit arrangement of the invention in one form of telephone apparatus.

Referring first to FIG. 1, telephone subscriber's apparatus 10 comprises a receiver transducer Rx and a transmitter transducer Tx each shunted by normally-open "dial-off-normal" contacts ON1 and ON2. The transducers Rx and Tx are connected by conventional circuitry to a pair of line terminals T1 and T2, in series with impulsing contacts IMP and a gravity switch GS. The contacts of the gravity switch GS are open when the handset (not shown) is resting on the cradle (not shown) of the apparatus and are closed when the handset is removed from the cradle.

The impulsing contacts IMP (which may be a semiconductor switch, or part of a reed relay) are operated by an electronic dialling circuit 12. Impulsing contacts IMP and the dialling circuit 12 may together constitute an impulse trabsmitter as described in the complete specification of U.K. Pat. No. 1,236,961. There is also provided a unit (not shown) having ten push-buttons which are numbered 0 to 9 respectively, and the arrangement is such that the number of the wanted subscriber may be "dialled" merely by pressing a sequence of these pushbuttons characterising the digits of the number to be called, these digits being temporarilly stored by the circuit 12 and each in turn being utilised to control the impulsing contacts IMP to interrupt the loop between the terminals T1 and T2, after the handset has been lifted, to produce a train of "dialling" impulses.

The dialling circuit 12 requires a supply of direct current to power its operation. However the telephone apparatus under consideration includes no battery or other such source of direct current. The required current to power the dialling circuit 12 is in fact supplied by a circuit arrangement 14 which is arranged, as will hereinafter be described, to store electric energy obtained from a remote source, such as a battery at the local exchange 15, by the flow of direct current over the line wires 13 connected to the terminals T1 and T2 when those terminals are looped, the circuit arrangement 14 being connected in the loop between the terminals T1 and T2.

Figure 2:
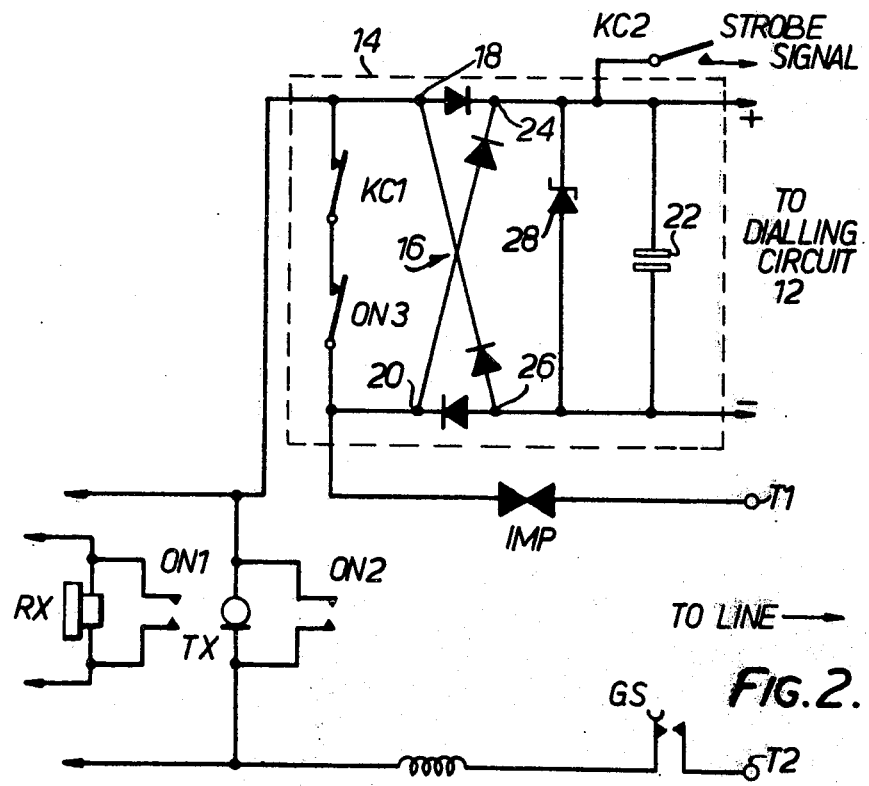
FIG. 2 is a schematic circuit diagram of part of the apparatus of FIG. 1, showing a first embodiment of the invention in detail.

Referring now to FIG. 2, this shows a first embodiment of the circuit arrangement 14 in detail. Basically, it comprises a full-wave rectifying diode bridge 16 whose terminals 18 and 20 are connected in series with the line between the terminals T1 and T2, and are shunted by two sets of series-connected contacts KC1 and ON3 both of which are normally closed. The contacts ON3 are functionally part of the same switch as the contacts ON1 and ON2, and operate contemporaneously therewith under the control of the dialling circuit 12. The contacts KC1 are associated with the pushbutton unit and are opened upon depression of any one of the pushbuttons.

A capacitor 22 is connected across the terminals 24 and 26 of the diode bridge 16 to be charged by the current flowing in use between the terminals 18 and 20 when either or both of the contacts KC1 and ON3 are open. A zener diode 28 is connected in parallel with the capacitor 22 to limit the voltage to which the capacitor 22 can be charged, as well as limiting the back-e.m.f. appearing across the terminals 18 and 20 of the bridge 16. This limited voltage preferably does not exceed eight volts for standard British Post Office telephone systems.

To operate the above described arrangement, the gravity switch GS is closed, and one of the pushbuttons is depressed. This latter action opens the contacts KC1 and the current then flowing round the looped line between the terminals T1 and T2 is caused to pass through the bridge 16. The capacitor 22 thereupon charges up. Operation of one of said pushbuttons also closes normally open contacts KC2 connected between the positive output terminal of the circuit arrangement 14 and the circuit 12 so as to initiate operation of the circuit 12 as soon as the capacitor 22 is charged to a sufficient voltage. Operation of the circuit 12 is initiated within the forty millisecond minimum period for which the pushbutton will normally be depressed, and firstly the contacts ON3 are opened to keep the loop current flowing through the bridge 16, at the same time as the contacts ON1 and ON2 are closed to shunt the transducers Rx and Tx. Next, the circuit 12 will operate the impulsing contacts IMP, thereby breaking and making the line loop, for example, with break periods of 66 milliseconds and make periods of 34 milliseconds. The charge received by the capacitor 22 during the make periods is arranged to sustain the operation of the circuit 12 during the break periods.

When a train of dialling impulses characterising one decimal digit of the wanted subscriber's number has finished, there will be, typically, an 800 millisecond inter-digit pause (timed by the circuit 12) before the next train of impulses (if there is one) is transmitted and, at the end of that pause, the above sequence will repeat. This continues until dialling is finished, when the bridge 16 will be shunted by the closure of the contacts KC1 and ON3, and the transducers RX and Tx will be enabled by the opening of the contacts ON1 and ON2. The full line voltage is now available to the transducer Tx since the bridge 16 is shunted.

The value of capacitance of the capacitor 22 should be chosen to be small enough to charge to an adequate voltage during "make" periods of the contacts IMP, and at the same time, large enough to sustain the circuit 12 during the "break" periods of the contacts IMP.

Figure 3:
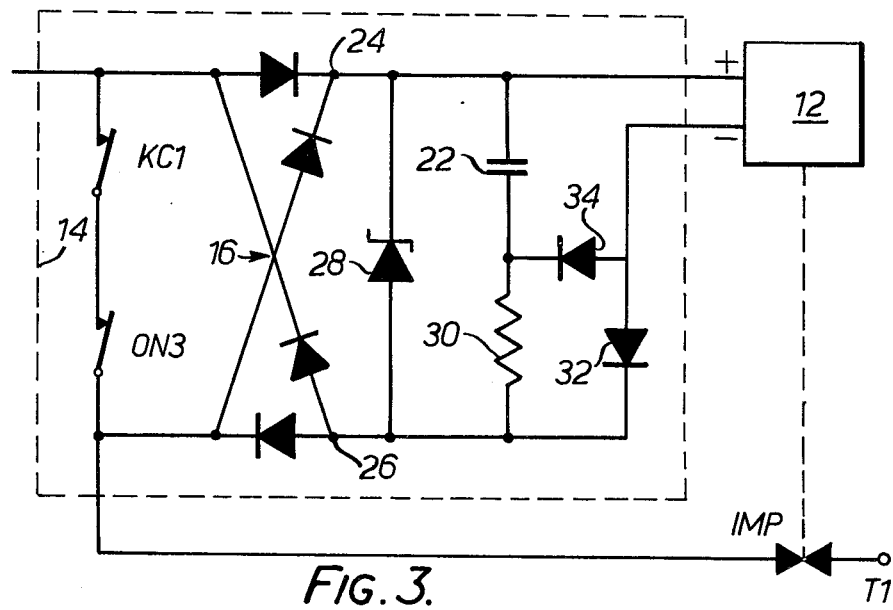
FIGS. 3 to 6 are respective schematic circuit diagrams of four further embodiments of the invention.
Figure 4:
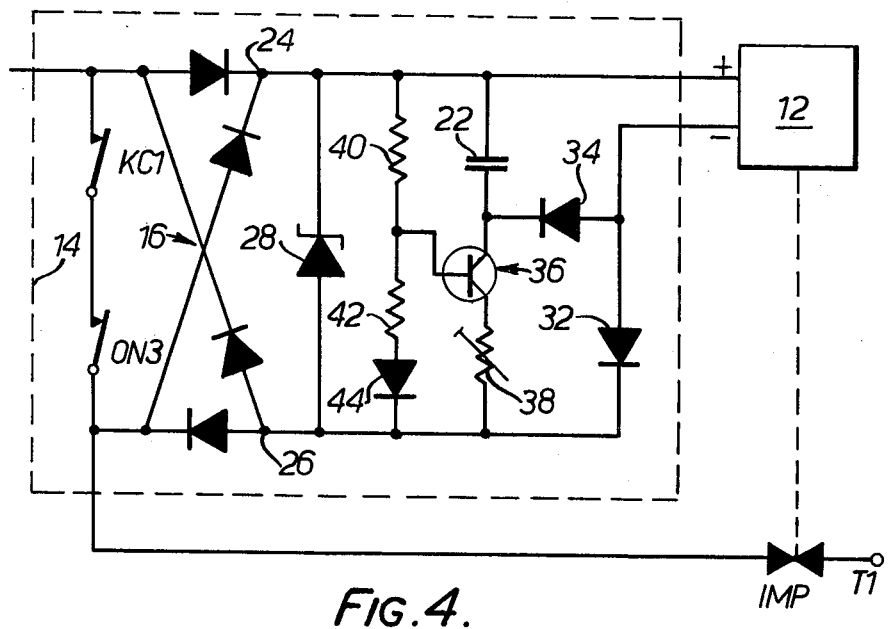

Referring now to FIGS. 3 and 4, these illustrate modified versions of the circuit arrangement 14, those parts corresponding to like parts in FIG. 2 being given the same references. The modifications are such as enable the circuit 12 to function immediately the contacts KC1 is opened, without the transient shorting out of the supply to the circuit 12 in the FIG. 2 arrangement due to the capacitor 22 being initially totally discharged. The risk in the FIG. 2 arrangement is that the contacts KC1 will close again before the contacts ON3 are opened by the circuit 12, and so prevent the circuit 12 coming into operation.

This risk is prevented by providing a current supply path for the circuit 12 immediately the contacts KC1 are opened, and by limiting the current drawn by the capacitor 22 to a value such that the voltage available to drive current along this supply path is adequate to power the circuit 12. In the embodiment shown in FIG. 3, this capacitor charge current limiting is ensured by a resistor 30, and the path for the immediate supply to the circuit 12 is provided by a diode 32 connected in series with the circuit 12 across the terminals 24 and 26. During the time that the line loop is broken by opening of the contacts IMP, the circuit 12 remains powered by discharge current from the capacitor 22 flowing through a further diode 34.

In the embodiment shown in FIG. 4, the capacitor sharge current limiting is ensured by a nominally constant current circuit comprising a transistor 36 in series with a resistor 38 whose value may be adjustable to ensure that the initial charging current drawn from the line does not exceed a predetermined value. The transistor 36 is biased by tapping a potential dividing chain comprising two resistors 40 and 42, and a diode 44 whose characteristics match the base-emitter junction of the transistor 36.

The arrangement of FIG. 4 is preferred to that of FIG. 3 since the relative constancy of capacitor charging current enables the capacitor 22 to charge more rapidly than in the FIG. 3 arrangement, where the charging tapers off exponentially, at times when the capacitor is already partly charged, as for example during interpulse pauses.

By way of example, in the FIG. 4 arrangement, the line loop current could lie in the range from twenty milli-amps to one hundred and twenty milli-amps. The zener diode 28 will pass, say, from one milli-amp to one hundred and one milli-amps, leaving nineteen milli-amps for the simultaneous supply of the circuit 12 and the charging of the capacitor 22. Since six milli-amps are to be allowed for the supply of the circuit 12, thirteen milli-amps are circulated to charge the capacitor 22.

Bearing in mind that the periods of discharging and charging the capacitor 22 while a train of impulses is being suppled are approximately in the ratio 2 to 1, it will be appreciated that, provided the capacitor 22 is of sufficient capacity, it receives sufficient replenishing charges during the charging periods to maintain a sufficient voltage thereacross to power the dialling circuit 12. The capacitor 22 may have a capacity of the order of 2000 microfarads.

If the resistor 30 has a value of five hundred ohms, a similar effect will be achieved in the FIG. 3 arrangement.

Diode arrangements other than full-wave bridges may be employed within the scope of the invention. Voltage limited devices other than zener diodes may be employed, or omitted altogether.

Figure 5:
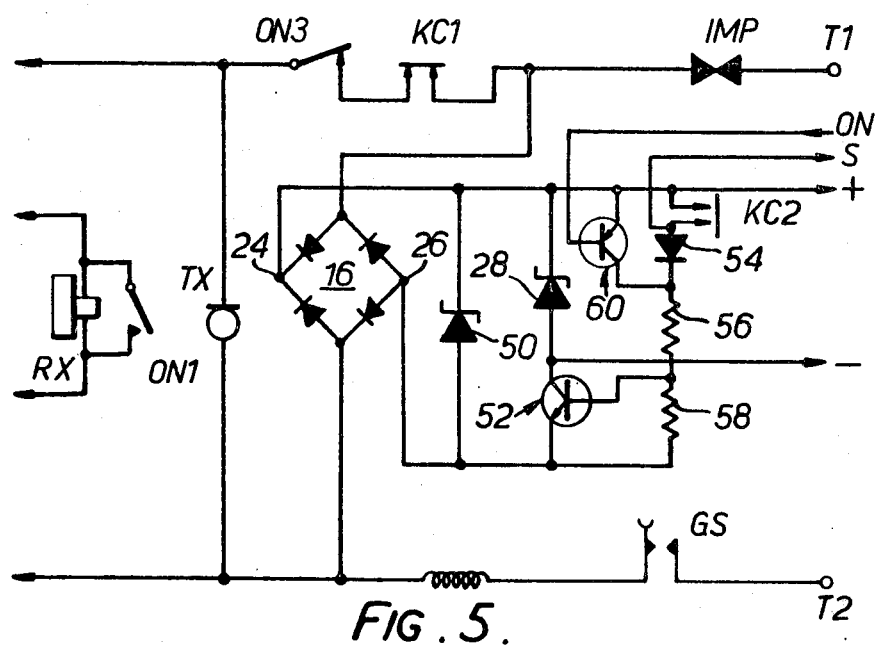

Referring now to FIG. 5, the opening of normally-closed contact KC1 (upon a push-button being pressed to "dial out" a decimal digit) will cause the rectifier bridge 16, which in this case is effectively in parallel with the speech circuits of the apparatus, to be energised and the corresponding normally-open contact KC2 will close about 2 milliseconds later. (KC1 and KC2 form two halves of a make-plus-break microswitch.) During the interim period when both the contacts KC1 and KC2 are open, a zener diode 50 connected across the d.c. terminals 24 and 26 of the bridge 16 presents total disconnection of the line loop between the terminals T1 and T2. The breakdown voltage of the zener diode 50 exceeds the maximum voltage which can be produced by the transmitter-transducer Tx in normal working conditions, respectively fifteen volts and seven volts (the latter for a typical British telephone).

When the contact KC2 closes, a strobe signal is delivered along the lead S to initiate operation of the electronic dialling circuit 12 (not shown) as soon as sufficient power is available therefor, and at the same time a transistor 52 is switched to conduction by a base biasing voltage applied via a diode 54 (whose function is explained below) and resistors 56 and 58. The conduction of the transistor 52 causes the line loop voltage to appear across the zener diode 28 and also the power supply terminals + and − which lead to the circuit 12 (not shown).

That part of the line loop current which is not shunted by the zener diode 28 then powers the circuit 12, and together with the strobe signal via the lead S, initiates operation of the circuit 12. Then, before the contact KC2 can open again, bridging transistor 60 is switched to conduction by an "off-normal" signal coming from the circuit 12 along a lead ON. The diode 54 is chosen to match the forward characteristics of the base-emitter junction of the transistor 60, so that the conduction of the transistor 52 is not affected. The zener diode 50 protects the transistor 52 against voltage surges.

To store power for energising the circuit 12 during the periods when the contacts IMP are open either a capacitor 22, as in FIG. 2 or the capacitor/capacitor charging circuits of FIGS. 3 and 4 may be connected across the terminals + and −.

The arrangement of FIG. 5 replaces the line relay contact ON2 by a zener diode 50 and transistors 52 and 60 (with associated diode 54 and resistors 56 and 58). Since the three-pole relay ON is customarily a dry reed latching relay, which relays are at present conveniently obtainable only in two-pole form, the arrangement of the present invention enables elimination of one of the two such relays (connected to operate in parallel) that would otherwise be required. This represents a desirable reduction in cost.

Figure 6:
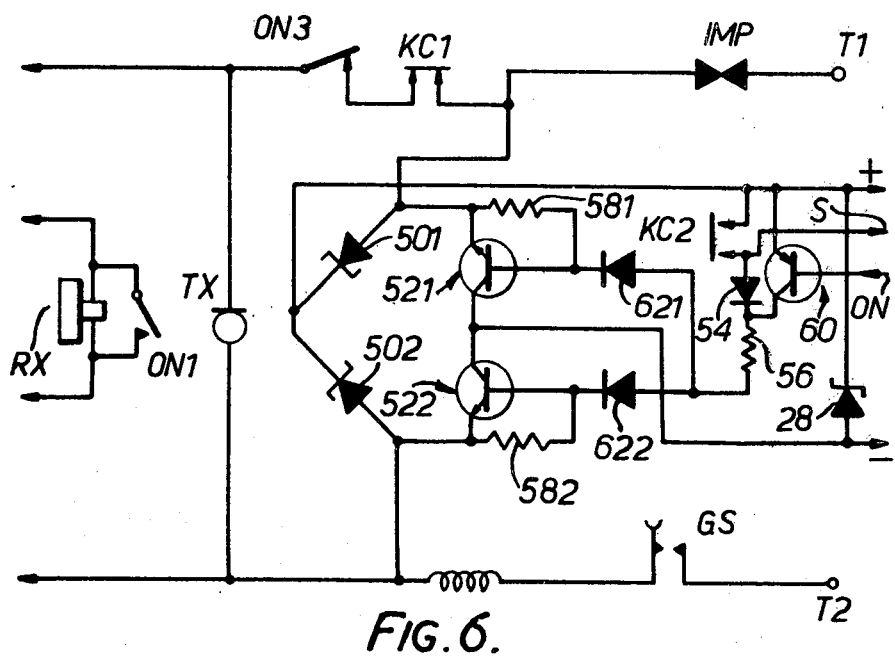

FIG. 6 illustrates a modification of the arrangement shown in FIG. 5 which nevertheless functions in the same manner.

In FIG. 6, the rectifying diode bridge 16 of FIG. 5 is replaced by a pair of zener diodes 501 and 502, and a pair of transistors 521 and 522. In their reverse current directions, the zener diodes 501 and 502 perform the function of the zener diode 50 of FIG. 5, and in their forward current direction function as rectifying diodes equivalent to half of the bridge 16. When switched to conduction, the transistors 521 and 522 function as the remaining half of the rectifying bridge 16, which they partly replace, and also perform the function of the transistor 52 in FIG. 5. The transistors 521 and 522 are switched off and on in like manner to the arrangement of FIG. 5, the resistor 58 in FIG. 5 being replaced by resistors 581 and 582 which perform corresponding functions. A pair of diodes 621 and 622 are included between the resistors 581 and 582, and 56 respectively, in order to obviate the sneak path that would otherwise appear through the resistors 581 and 582 in series, from shunting the transmitter transducer TX when the contacts ON3 and KC1 are both closed. The diodes 621 and 622 also prevent a shunt drain on the line loop current when power is required for the circuit 12.

Modification of the above described arrangement can be made as follows:

The zener diodes 501 and 502 can be ordinary diodes if the contact KC2 makes before the contact KC1 breaks.

In the arrangements of FIGS. 5 and 6 the receiver transducer Rx is conductively isolated from the line loop by the opening of the contact ON3 but remains inductively coupled to the coil next to gravity switch GS which is in the line loop at all times. Thus severe clicks will be produced in the receiver Rx if it is not shunted by contact ON1. However, if the two circuit arrangements of the present invention were connected to a point between the coil and the gravity switch GS so as to exclude the coil from the line loop during dialling, then the contact ON1 could be eliminated.

We claim:

1. Telephone apparatus, such as a subscriber's set, including
   A. an electronic circuit for generating dialling impulses,
   B. a circuit arrangement for energizing said electronic circuit comprising
      i. a capacitor,
      ii. bridge rectifier means,
      iii. current limiting means,
      iv. switch means for connecting said rectifier means in series with the line loop and for connecting said capacitor to be charged by way of said current limiting means by at least a portion of line loop current passing through said rectifier means, during the time that said electronic circuit requires current for its operation, and for preventing line loop current passing through said rectifier means when dialling has ceased, and
      v. further rectifier means to derive current for said electronic circuit means from either side of said current limiting means, whereby said electronic circuit means is energized initially before said capacitor is sufficiently charged.

2. Telephone apparatus, such as a subscriber's set, including
   A. an electronic circuit for generating dialling impulses,
   B. a circuit arrangement for energizing said electronic circuit comprising
      i. a capacitor,
      ii. bridge rectifier means comprising
         a. a pair of semiconductor diodes and
         b. a pair of transistors, and
      iii. means to bias at least one of said transistors so as to connect said capacitor to be charged by at least a portion of line loop current passing through said rectifier means, during the time that said electronic circuit requires current for its operation, and to prevent line loop current passing through said rectifier means when dialling has ceased,
      iv. the rectifier means being in shunt relationship with the speech circuits of the apparatus,
      v. which speech circuits are disconnected by a normally closed series switch when said electronic circuit requires current for its operation, and
      vi. the line loop current path through the rectifier means being opened when dialling has ceased.

* * * * *